United States Patent [19]

Schukei

[11] Patent Number: 4,505,017

[45] Date of Patent: Mar. 19, 1985

[54] METHOD OF INSTALLING A TUBE SLEEVE

[75] Inventor: Glen E. Schukei, South Windsor, Conn.

[73] Assignee: Combustion Engineering, Inc., Windsor, Conn.

[21] Appl. No.: 449,917

[22] Filed: Dec. 15, 1982

[51] Int. Cl.³ .............................................. B23P 15/26
[52] U.S. Cl. ........................ 29/157.3 R; 29/157.3 C; 29/523; 165/173; 165/178; 285/222
[58] Field of Search .......... 29/157.3 C, 523, 157.3 R, 29/402.01, 402.02, 402.09, 402.19, 403.1, 403.3, 403.2, 403.4; 165/173, 175, 178; 285/382.4, 222

[56] References Cited

U.S. PATENT DOCUMENTS

| | | | |
|---|---|---|---|
| 2,290,619 | 7/1942 | Rieger | 285/222 X |
| 3,208,136 | 9/1965 | Joslin | 29/523 X |
| 4,069,573 | 1/1978 | Rogers, Jr. et al. | 29/157.3 C X |
| 4,393,564 | 7/1983 | Martin | 29/157.3 C |
| 4,413,395 | 11/1983 | Garnier | 29/157.3 C |

FOREIGN PATENT DOCUMENTS 1190238 4/1970 United Kingdom ............... 285/222

Primary Examiner—Carl E. Hall
Assistant Examiner—John T. Burtch
Attorney, Agent, or Firm—L. James Ristas

[57] ABSTRACT

A method for installing a close-fitting cylindrical metal sleeve (26) within a tube (14) secured to a tube sheet (12) of a steam generator, comprising the following steps. First, the sleeve is inserted into the tube until an upper portion (28) of the sleeve is above the tube sheet while the lowr portion (30) of the sleeve is within the tube sheet. Next, the upper portion of the sleeve is radially deformed against the adjacent tube wall to form substantially coextensive permanent bulges (32,34) around the circumferences of the sleeve and the tube. The sleeve is then displaced axially, or longitudinally, relative to the tube, such that the bulge in the sleeve produces a wedge-like mechanical interference seal (40) against the tube wall (16'). Finally, the lower portion (30,38) of the sleeve is joined and sealed (42) against the adjacent tube wall (16') to permanently maintain the tight mechanical interference seal at the upper portion of the sleeve.

12 Claims, 7 Drawing Figures

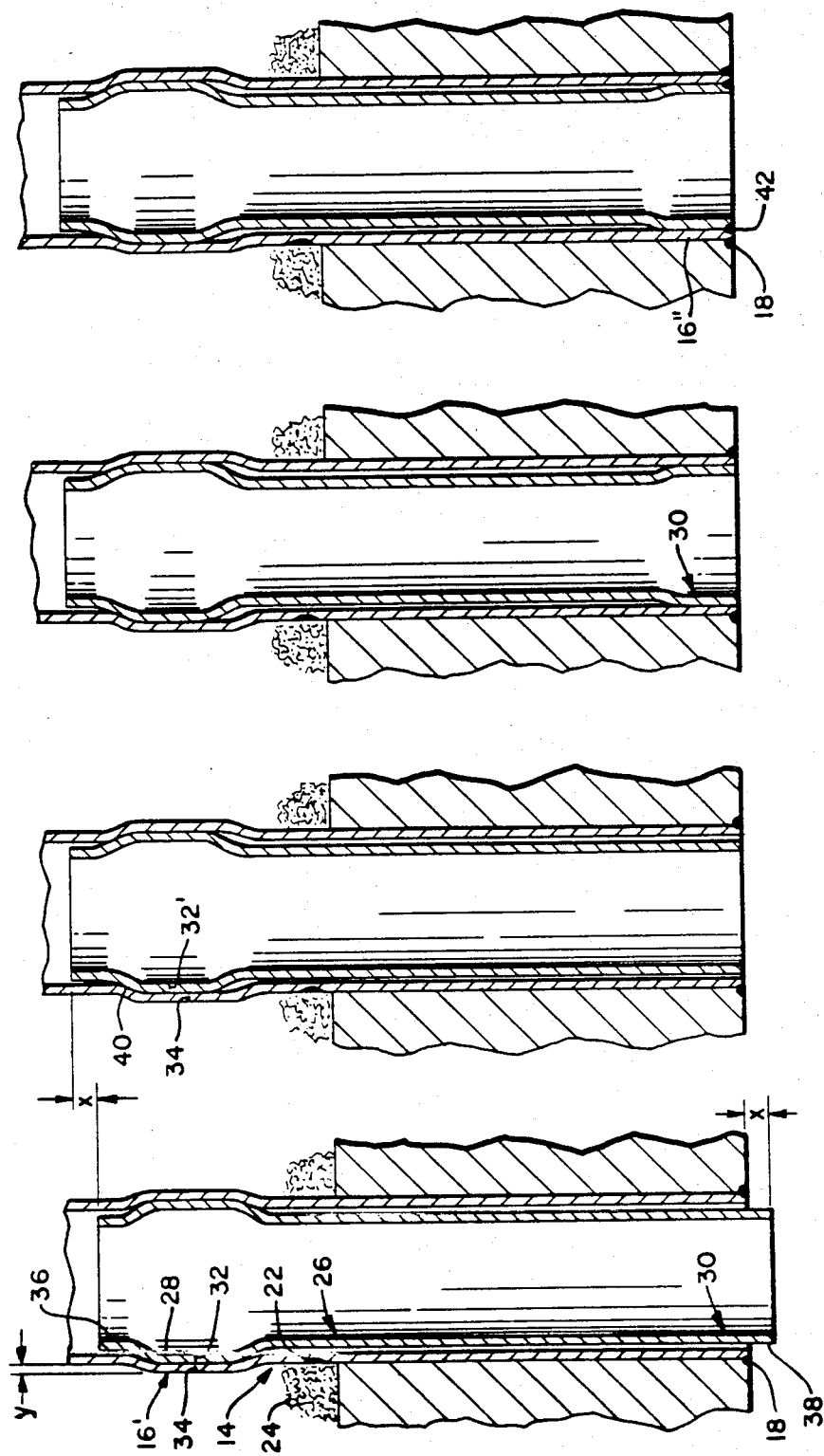

METHOD OF INSTALLING A TUBE SLEEVE

BACKGROUND OF THE INVENTION

Large heat exchangers, particularly steam generators in pressurized water reactor (PWR) nuclear power plants, typically contain a multiplicity of tubes secured at their ends to a tube sheet. The tube sheet serves not only to secure the tubes in place, but also to separate the shell side fluid outside the tubes, from the fluid passing through the tubes.

In the vertically oriented PWR steam generators, crud or sludge deposits accumulate on the tube sheet and in some cases produce deterioration of the tube wall at an elevation immediately above the tube sheet. Since it is virtually impossible to replace individual tubes in a nuclear steam generator, one solution has been install a sleeve within each such deteriorated tube.

The sleeve must provide a substantially leak tight seal whereby the deterioration portion of the tube is isolated from the fluid flow within the tube. In nuclear steam generators, even if the deterioration continues and the tube is perforated, the radioactive fluid from the tube side must not have a flow path to the shell side.

Although seemingly a simple matter, proper and effective sleeving of steam generator tubes presents several difficult problems. Repair work to the steam generator, such as sleeve installation, is performed in a highly radioactive environment, even though the steam generator is first drained. Thus, it is desirable that each sleeve be installed in a minimum of time, and preferably be adapted for remote, automated installation. Some tube sleeving techniques deform the sleeve into the surrounding tube, but this is much easier at the elevation of the tube sheet where the tube has a rigid backup. At elevations above the tube sheet, the tube has no backup and the amount of sleeve deformation into the tube must be carefully controlled and limitied to avoid overstressing the tube. Concern over excess deformation greatly limits the ability to confidently effect a tight seal between the sleeve and tube by merely deforming one against another.

Furthermore, the sleeve and tube expand and contract according to the operating history of the power plant, yet the seals therebetween must remain effective. Also, the sleeve must not provide sites where crud or other solids may accumulate and induce further deterioration of the tube or sleeve. Finally, the sleeve must perform its desired function over the remaining life of the steam generator, which may typically be in excess of thirty years.

SUMMARY OF THE INVENTION

According to the present invention, a method is claimed for installing a close-fitting cylindrical metal sleeve within a tube secured to a tube sheet of a steam generator, comprising the following steps. First, the sleeve is inserted into the tube until an upper portion of the sleeve is above the tube sheet while the lower portion of the sleeve is within the tube sheet. Next, the upper portion of the sleeve is radially deformed against the adjacent tube wall to form substantially coextensive permanent bulges around the circumferences of the sleeve and the tube. The sleeve is then displaced axially, or longitudinally, relative to the tube, such that the bulge in the sleeve produces a wedge-like mechanical interference seal against the tube wall. Finally, the lower portion of the sleeve is joined and sealed against the adjacent tube wall to permanently maintain the tight mechanical interference seal at the upper portion of the sleeve.

BRIEF DESCRIPTION OF THE DRAWINGS

A more detailed description of the preferred embodiment of the invention is set forth below with reference to the accompanying drawings, in which:

FIGS. 2a–2d are a schematic illustration of the steps of the inventive method, and more particularly, FIG. 2(a) shows the sleeve upper portion deformed radially outward against the adjacent tube wall, FIG. 2(b) shows the sleeve displaced upwardly relative to the position in FIG. 1(a), FIG. 2(c) shows the lower portion of the sleeve expanded against the tube and tube sheet, and FIG. 2(d) shows the lower end of the sleeve welded to the lower end of the tube;

DESCRIPTION OF THE PREFERRED EMBODIMENT

Figure 1:
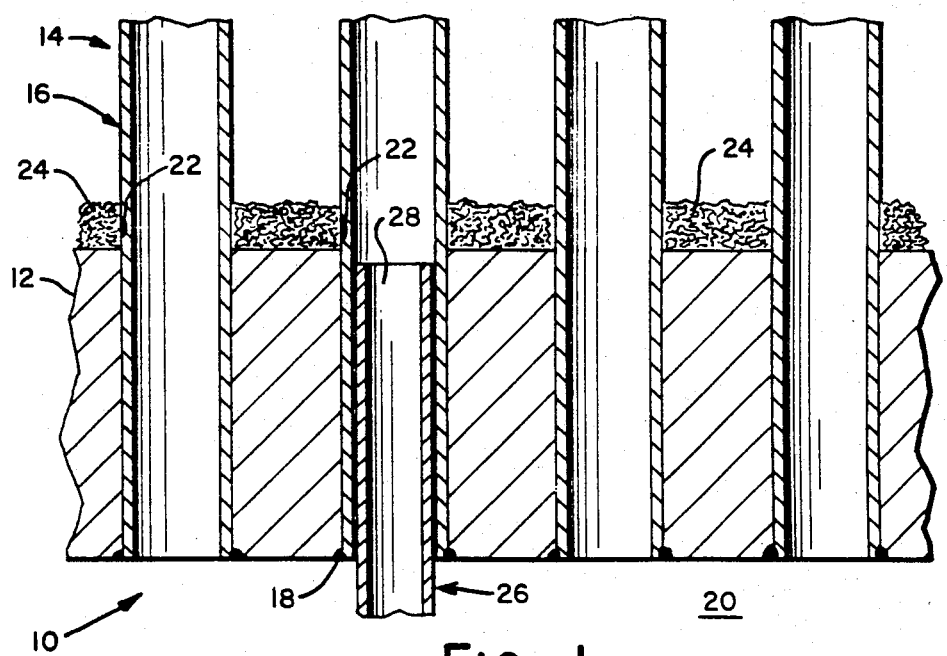
FIG. 1 is a schematic illustration of a portion of the tube sheet of a vertically oriented heat exchanger, showing the tubes secured therein and a sleeve partially inserted into one of the tubes from below the tube sheet.

FIG. 1 shows a portion of a heat exchanger, such as a vertically oriented steam generator 10 having a thick metal tube sheet 12 which secures and spaces a plurality of heat exchanger tubes 14 preferably made of Inconel. The tubes 14 are typically cylindrical, having thin walls 16 which are welded at 18 to the bottom of the tube sheet 12. The area 20 below the tube sheet contains, during steam generator operator operation, a supply of subcooled primary fluid at about 2250 psi which is pumped up through the tubes 14 to generate steam from the water at about 900 psi surrounding the tube wall 16. In nuclear steam generators, the region 20 is highly radioactive and accordingly, when the region is drained, workmen who attempt to perform any maintenance or repair operations on the tubes 14 must work quickly and be closely monitored as to radioactive exposure.

One important type of operation repairs tube deterioration at locations such as 22, immediately above the tube sheet 12. The tube deterioration 22 is caused by corrosion and heat transfer effects at the tube wall location adjacent to the layer of sludge or crud 24 that has been found to accumulate on the upper surface of the tube sheet 12.

The present invention relates to a method for efficiently and effectively installing a sleeve 26 into the degraded tube.

Referring now to FIGS. 1 and 2, the sleeve 26 is a thin walled, hollow, cylindrical member, preferably of the same material as the tube 14, that closely but readily fits tube 14. The length of the sleeve 26 is typically two or three times the thickness of the tube sheet 12. The sleeve 26 is inserted into the tube 14 until the upper portion 28 is above the tube sheet while a lower portion 30 is within the tube sheet.

Referring now to FIG. 2(a) it should be evident that the upper portion 28 of the sleeve must be above the tube defect 22 which is typically located above the tube sheet 12 at the elevation of the sludge deposit 24.

As a second step of the invention, the upper portion of the sleeve 28 is radially deformed outwardly into the adjacent tube wall 16' to form generally coextensive, permanent bulges around the circumferences of the sleeve and tube. The peaks, or centers, of the bulges are normally at the same elevation relative to the tube sheet, and are represented at 32 as the center of the sleeve bulge and at 34 as the center of the tube bulge. A conventional expander device adapted for use against unsupported tube walls, such as the type disclosed in U.S. Pat. No. 4,069,573, "Method of Securing a Sleeve Within a Tube" can be used to perform this step. Typically, the bulge height y of the tube wall 16' is about 0.01 inch.

Referring now to FIGS. 2(a) and (b), the second step of the invention is to further insert the sleeve 26 to axially, or longitudinally, displace the sleeve bulge 32 slightly relative to the tube bulge 34, whereby a tight mechanical interference seal 40 is formed between the sleeve bulge and the tube wall 16. This is illustrated by the displacement of the sleeve upper end 36 and sleeve lower end 38 relative to the adjacent tube 16 and tube sheet 12. In the preferred embodiment, the sleeve 26 is initially inserted and the bulge 32 formed with the sleeve lower end 38 protuding a predetermined distance x, preferably about 0.06 inch, below the tube sheet 12. The second step of the method forces the sleeve upwardly so that the sleeve lower end 38 is brought flush with the tube sheet.

The final step of the method is to permanently join and seal the lower portion 30 of the sleeve to the adjacent tube wall while the sleeve bulge 32 is in a displaced position relative to the tube bulge 34. Preferably, this is done as shown in FIGS. 2(c) and (d). The lower sleeve portion 30 is expanded against the tube. A considerable expansion force may be used since the tube wall is backed up by the sheet. Then, the sleeve lower end is preferably welded 42 to the tube 14 or tube sheet 12. It should be understood that any conventional technique for permantly joining and sealing the sleeve lower end 38 to the tube sheet falls within the scope of the present invention.

Figure 3A:
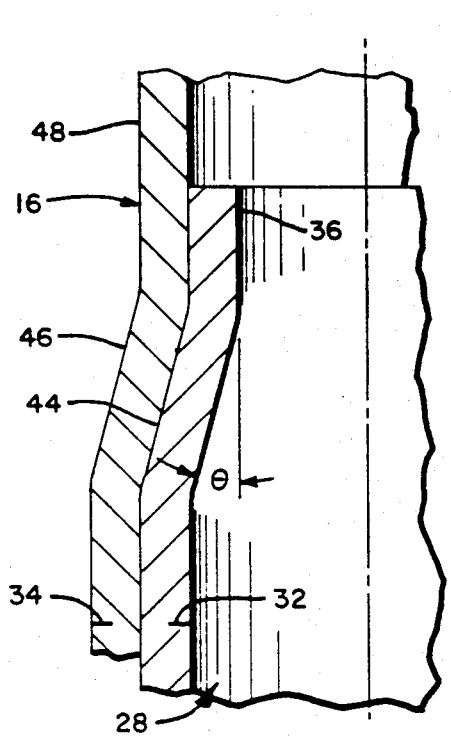
FIG. 3(a) is an idealized schematic representation of the relationship between the sleeve bulge and the tube bulge corresponding to the step illustrated in FIG. 2(a)

FIGS. 3(a) and (b) show in more detail, an idealized representation of the manner in which the mechanical interference seal 40 is achieved when the sleeve 26 is axially displaced after the bulges 32,34 have been formed. FIG. 3(a) corresponds to FIG. 2(a) and shows the sleeve upper portion 28 with the bulge center 32 aligned with the sleeve bulge 34. The tube bulge taper 46 and sleeve bulge taper 44 are generally coextensive and in contact around substantially the entire sleeve and tube circumference. Such contact does not, however, provide a sufficient, leak tight seal for purposes of permanently repairing a defective tube. Accordingly, the additional step of forcing the sleeve upwardly within the tube, as illustrated in FIGS. 2(b) and 3(b) effectuates the leak tight circumferential seal 40.

Figure 3B:
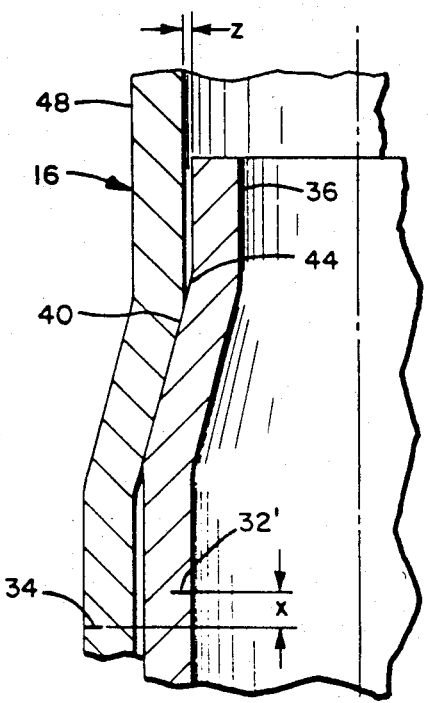
FIG. 3(b) is an idealized schematic representation of the relationship between the sleeve bulge and tube wall at the mechanical interference seal, as produced by the axial displacement step corresponding to FIG. 2(b).

As shown in FIG. 3(b), the sleeve bulge 32' is displaced a distance x relative to the tube bulge 34. The sleeve bulge taper 44, which was initially at an angle $\theta$ relative to the underformed tube portion 48, acts like a wedge to produce stress concentration at 40 and effectuate the circumferential seal. The wedge-like effect of the displaced sleeve bulge taper 44 also causes a separation of the undeformed tube 48 from the sleeve upper end 36, by an amount represented by z. The relationship between the separation z and the axial displacement x can be derived from the simple trigonometric relationship $z = x(\tan \theta)$. The separation is a measure of the tightness of interference fit; it is evident that the larger the axial displacement distance x, the tighter the joint 40.

In a typical tube repair, the bulge taper 44 will be in the range from about $\theta = \frac{1}{2}°$ to about 10°. As an example of one embodiment, a displacement x of about 0.06 inch and a taper angle of 10°, will produce 0.01 inch interference fit. It should be understood that, since the schematic is somewhat idealized, the total effective interference fit of 0.01 inch is manifested by a 0.005 bending of both the tube and sleeve in the joint area. Effective interference ranging from about 0.002–0.015 inch should provide satisfactory sealing.

Through routine trial and error, one skilled in this art can determine the optimum relationship between the taper angle, $\theta$ and the displacement distance x that would provide a satisfactory seal. Typically, the range of displacement distance would be about 0.05 to 0.25 inch, and the total effective interference would be about 0.002 through 0.015 inch.

The foregoing description sets forth the detailed steps of carrying out the invention. It should be appreciated that other routine, conventional steps may also be advantageously employed, such as cleaning the sleeve and tube to obtain a smooth surface and putting a very thin lubricant or anti-seiz plating on the sleeve to keep it from galling as it movex into the wedge position indicated in FIG. 3(b).

I claim:

1. A method for installing a close-fitting cylindrical metal sleeve within a tube secured to a tube sheet of a steam generator, comprising the sequential steps of:
   inserting the sleeve into the tube until an upper portion of the sleeve is above the tube sheet while a lower portion of the sleeve is within the tube sheet;
   outwardly radially deforming said upper portion of the sleeve and the adjacent tube wall to form substantially coextensive permanent bulges around the circumferences of the sleeve and tube;
   further inserting the sleeve to axially displace the sleeve bulge relative to the tube bulge, whereby a tight mechanical interference seal is formed between the sleeve bulge and the tube wall;
   permanently joining and sealing said lower portion of the sleeve to the adjacent tube wall while the sleeve bulge is displaced relative to the tube bulge.

2. The method of claim 1 wherein the step of radially deforming the tube and sleeve produces a sleeve bulge having a peak at substantially the same axial location as the tube bulge.

3. The method of claim 1 wherein the tube bulge peak is about 0.01 inch above the tube wall.

4. The method of claim 1 wherein the lower end of the sleeve extends below the tube sheet a short distance during the step of radially deforming the sleeve and tube.

5. The method of claim 4 wherein the step of further inserting the sleeve produces an axial displacement which aligns the end of the sleeve and tube in preparation for the joining and sealing step.

6. The method of claim 1 wherein the step of further inserting the sleeve produces an axial displacement in the range of about 0.05 to about 0.25 inch.

7. The method of claim 1 wherein the step of permanently joining and sealing said lower portion of the sleeve includes expanding the lower portion against the adjacent tube wall and welding the lower end of the sleeve to the lower end of the tube.

8. The method of claim 1 wherein the step of further inserting the sleeve includes forcing the tapered leading edge of the bulge of the sleeve into the undeformed portion of the tube above the tube taper.

9. The method of claim 2 wherein the bulge formed by radially deforming the sleeve has a bulge taper angle of between about $\frac{1}{2}°$ and 10°.

10. The method of claim 8 wherein the step of further inserting the sleeve produces an effective mechanical interference in a range of about 0.002–0.015 inch.

11. The method of claim 9 wherein the step of further inserting the sleeve includes forcing the tapered leading edge of the bulge of the sleeve into the undeformed portion of the tube above the tube taper.

12. The method of claim 11 wherein the step of further inserting the sleeve produces an effective mechanical interference in a range of about 0.002–0.015 inch.

* * * * *